(12) United States Patent
Sun et al.

(10) Patent No.: US 11,630,762 B2
(45) Date of Patent: Apr. 18, 2023

(54) METHOD AND APPARATUS FOR TESTING MAP SERVICE

(71) Applicant: Beijing Baidu Netcom Science and Technology Co., Ltd., Beijing (CN)

(72) Inventors: Yubo Sun, Beijing (CN); Zhongxin Qu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 189 days.

(21) Appl. No.: 17/210,370

(22) Filed: Mar. 23, 2021

(65) Prior Publication Data

US 2021/0248060 A1    Aug. 12, 2021

(30) Foreign Application Priority Data

Jun. 19, 2020   (CN) .......................... 202010566638.7

(51) Int. Cl.
| | | |
|---|---|---|
| *G06F 11/36* | (2006.01) | |
| *G06F 16/14* | (2019.01) | |
| *G06F 16/178* | (2019.01) | |
| *G01C 21/00* | (2006.01) | |
| *G08G 1/01* | (2006.01) | |

(52) U.S. Cl.
CPC ...... *G06F 11/3688* (2013.01); *G06F 11/3684* (2013.01); *G06F 16/148* (2019.01); *G06F 16/178* (2019.01); *G01C 21/38* (2020.08); *G08G 1/0141* (2013.01)

(58) Field of Classification Search
CPC .. G06F 11/36; G06F 11/3688; G06F 11/3684; G06F 16/148
See application file for complete search history.

(56) References Cited

U.S. PATENT DOCUMENTS

| | | | |
|---|---|---|---|
| 7,043,357 B1 | 5/2006 | Stankoulov et al. | |
| 10,599,688 B2* | 3/2020 | Zhou | G06F 16/90344 |
| 2021/0092018 A1* | 3/2021 | Fang | H04L 47/20 |
| 2021/0092019 A1* | 3/2021 | Fang | H04L 61/4511 |
| 2021/0139023 A1* | 5/2021 | Crego | B60W 60/00276 |
| 2021/0192867 A1* | 6/2021 | Fang | G07C 5/008 |
| 2021/0407220 A1* | 12/2021 | Fang | G07C 5/0816 |

(Continued)

FOREIGN PATENT DOCUMENTS

WO      2010151001 A2    12/2010

OTHER PUBLICATIONS

European Patent Office, Extended European Search Report for Application No. 21164235.0, dated Oct. 11, 2021 (12 pages).

(Continued)

*Primary Examiner* — Kamini B Patel
(74) *Attorney, Agent, or Firm* — Nixon Peabody LLP

(57) ABSTRACT

A method and apparatus for testing a map service are provided. The method may include: determining a to-be-screened service request based on a service request of an electronic map recorded in advance at a preset sampling frequency; screening the to-be-screened service request by using a static rule, to obtain a first valid service request set; screening the to-be-screened service request by using a dynamic test step, to obtain a second valid service request set; and testing a service of the electronic map based on the first valid service request set and the second valid service request set.

13 Claims, 6 Drawing Sheets

(56) References Cited

U.S. PATENT DOCUMENTS

2022/0076486 A1* 3/2022 Gundling ............... G06T 17/05
2022/0297635 A1* 9/2022 Fang ..................... B60R 16/023

OTHER PUBLICATIONS

Erdogan, A. et al.; "Parametrized End-to-End Scenario Generation Architecture for Autonomous Vehicles"; 2018 6th International Conference on Control Engineering & Information Technology (CEIT), IEEE, Oct. 25, 2018, pp. 1-6; XP033571800; DOI: 10.1109/CEIT.2018.8751872 (6 pages).

Klitzke, L. et al.; "Real-world Test Drive Vehicle Data Management System for Validation of Automated Driving Systems"; Proceedings of the 5th International Conference on Vehicle Technology and Intelligent Transport Systems, May 1, 2019, pp. 171-180; XP05583819; DOI: 10.5220/0007720501710180; ISBN: 978-989-7583-7402; retrieved from the Internet: https://pdfs.semanticscholar.org/5fa4/b80087756b9e6ec8f8ad2ba4a15e561.pdf (10 pages).

Medrano-Berumen, C. et al.; "Abstract Simulation Scenario Generation for Autonomous Vehicle Verification"; 2019 Southeastcon, IEEE, Apr. 11, 2019, pp. 1-6; XP033733826; DOI: 10.1109/SOUTHEASTCON42311.2019.9020575 (6 pages).

Manikanta Raju, V. et al.; "Performance of Open Autonomous Vehicle Platforms: Autoware and Apollo"; 2019 IEEE 5th International Conference for Convergence in Technology (I2CT), IEEE, Mar. 29, 2019, pp. 1-5; XP033739466; DOI: 10.1109/I2CT45611.2019.9033734 (5 pages).

Changjie, M.; "Intelligent Transportation and Autonomous Vehicles"; United Nations World Geospatial Information Congress; Nov. 21, 2018, pp. 1-10; XP055845562; retrieved from the Internet: https://ggim.un.org/unwgic/presentations/2.2_Ma_Changjie.pdf (10 pages).

* cited by examiner

METHOD AND APPARATUS FOR TESTING MAP SERVICE

CROSS-REFERENCE TO RELATED APPLICATIONS

This application claims priority to Chinese Application No. 202010566638.7, filed on Jun. 19, 2020 and entitled "Method and Apparatus for Testing Map Service," the content of which is hereby incorporated by reference in its entirety.

TECHNICAL FIELD

Embodiments of the present disclosure relate to the field of computer technology, specifically to the field of electronic map technology, the field of autonomous driving technology, the field of intelligent traffic technology, and more specifically to a method and apparatus for testing a map service.

BACKGROUND

The product architecture of the electronic map is complex, the coupling between service lines is serious, and there are many modules. More than 10 service lines, such as navigation, retrieval, image, walking and riding, public transportation, traffic condition, may be obtained from the service product perspective, and each service line is subordinate to dozens of modules. In order to ensure that the map service provided by the electronic map is normal, it is generally necessary to test the map service.

In the existing technology, a method for testing an electronic map generally simulates a real online traffic by constructing a request, and determines indexes such as availability, throughput, and horizontal response of a back-end service.

Specifically, a method for constructing a map product service request includes: (1) a service log is converted into a service request through a script tool. The general map service prints a key request field and a corresponding value into a log file, so as to facilitate the problem tracing. The log may be converted into request information of a corresponding module by writing a corresponding conversion tool. (2) The middleware is installed to an online instance in advance, and a real-time request of a user is transmitted to a to-be-tested module offline through a pipeline, so that the traffic is directly led to the service through middleware drainage.

SUMMARY

Embodiments of the present disclosure provide a method and apparatus for testing a map service.

In a first aspect, an embodiment of the present disclosure provides a method for testing a map service, the method including: determining a to-be-screened service request based on a service request of an electronic map recorded in advance at a preset sampling frequency; screening the to-be-screened service request by using a static rule, to obtain a first valid service request set; screening the to-be-screened service request by using a dynamic test step, to obtain a second valid service request set; and testing a service of the electronic map based on the first valid service request set and the second valid service request set.

In a second aspect, an embodiment of the present disclosure provides an apparatus for testing a map service, the apparatus including: a to-be-screened service request determining module, configured to determine a to-be-screened service request based on a service request of an electronic map recorded in advance at a preset sampling frequency; a static screening module, configured to screen the to-be-screened service request by using a static rule to obtain a first valid service request set; a dynamic screening module, configured to screen the to-be-screened service request by using a dynamic test step to obtain a second valid service request set; and a service testing module, configured to test a service of the electronic map based on the first valid service request set and the second valid service request set.

In a third aspect, an embodiment of the present disclosure provides an electronic device/server/intelligent terminal, including: at least one processor; and a memory communicatively connected with the at least one processor, the memory storing instructions executable by the at least one processor, and the instructions, when executed by the at least one processor, causing the at least one processor to perform the method according to any embodiment of the first aspect.

In a fourth aspect, an embodiment of the present disclosure provides a non-transitory computer readable storage medium storing computer instructions, the computer instructions being used to cause a computer to perform the method according to any embodiment of the first aspect.

Compared with the existing technology in which the scenario coverage rate is completely dependent on the time period of drainage and the size of the traffic, and for a product such as a map service with a large number of service scenarios, it is generally necessary to drainage for a long time to achieve a high coverage rate, and the rapid iteration of the product cannot be supported, in the process of embodiments of the present disclosure, the first valid service request set is screened by a static rule and the second valid service request set is screened by a dynamic test step when testing the service of the electronic map, so that the most valid service request in the original service requests is retained. The item test by using the valid service request can ensure that the scenario coverage can also be high under a short-time pressure test, and the rapid iteration of the product can be effectively supported.

It should be understood that the description in this section is neither intended to identify key or important features of embodiments of the present disclosure, nor intended to limit the scope of the present disclosure. Other features of the present disclosure will become readily apparent from the following description.

BRIEF DESCRIPTION OF THE DRAWINGS

The drawings are intended to provide a better understanding of embodiments of the present disclosure and are not to be construed as limiting embodiments of the disclosure.

Other features, objects, and advantages of embodiments of present disclosure will become more apparent by reading the following detailed description of non-limiting embodiments with reference to the accompanying drawings.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

It should also be noted that some embodiments in the present disclosure and some features in the disclosure may be combined with each other on a non-conflict basis. Features of the present disclosure will be described below in detail with reference to the accompanying drawings and in combination with embodiments.

In the method and apparatus for testing a map service according to embodiments of the present disclosure, first, a to-be-screened service request is determined based on a service request of an electronic map recorded in advance at a preset sampling frequency; then, the to-be-screened service request is screened by using a static rule, to obtain a first valid service request set; then, the to-be-screened service request is screened by using a dynamic test step, to obtain a second valid service request set; finally, a service of the electronic map is tested based on the first valid service request set and the second valid service request set.

Figure 1:
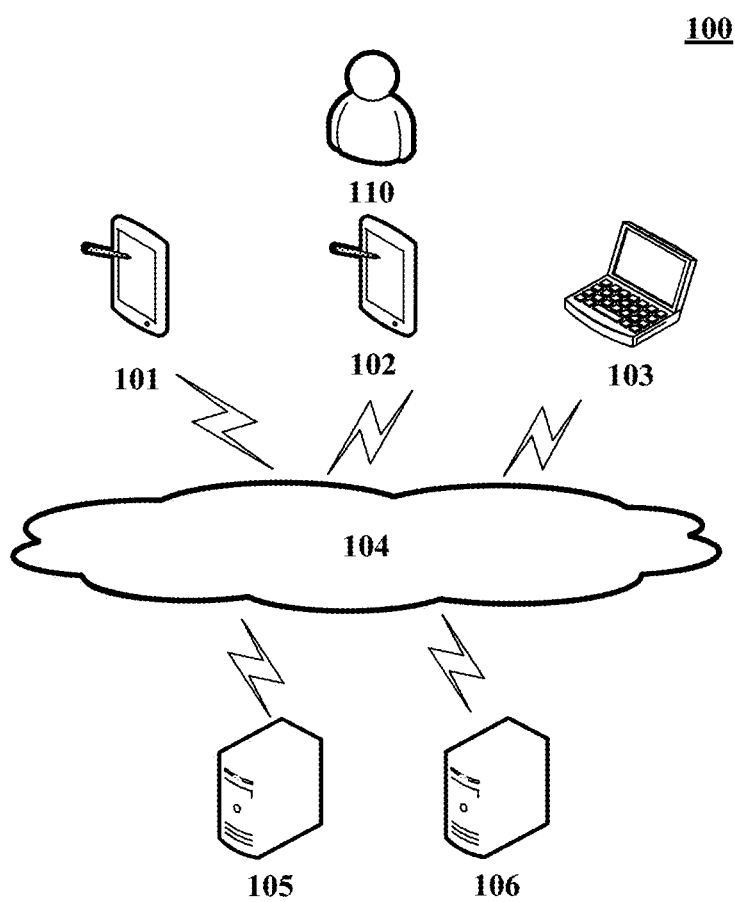
FIG. 1 is a diagram of an example system architecture in which embodiments of the present disclosure may be implemented.

FIG. 1 illustrates an example system architecture 100 in which a method for testing a map service or an apparatus for testing a map service of embodiments of the present disclosure may be implemented.

As shown in FIG. 1, the system architecture 100 may include terminal devices 101, 102, 103, a network 104, and a server 105. The network 104 serves as a medium for providing a communication link between the terminal devices 101, 102, 103 and the server 105. The network 104 may include various types of connections, such as wired or wireless communication links, or fiber optic cables.

The user may interact with the server 105 through the network 104 by using the terminal devices 101, 102, 103 to receive or send messages, etc. Various applications such as an image processing application, an audio playback application, a streaming media processing application, a multi-party interactive application, an artificial intelligence application, and a game application may be installed on the terminal devices 101, 102, 103.

The terminal devices 101, 102, 103 may be hardware or software. When the terminal devices 101, 102, 103 are hardware, the terminal devices 101, 102, 103 may be various electronic devices supporting a document processing application, including but not limited to an intelligent terminal, a tablet computer, a laptop computer, a desktop computer, and the like. When the terminal devices 101, 102, and 103 are software, the terminal devices 101, 102, 103 may be installed in the electronic devices mentioned above. The terminal devices 101, 102, 103 may be implemented, for example, as a plurality of pieces of software or software modules for providing distributed services, or as a single piece of software or software module. It is not specifically limited herein.

The server 105 may be a server providing various services, such as a backend server or an intermediate server providing support to the terminal devices 101, 102, 103. The backend server may perform processing such as analysis on data such as a received request, and feed back a processing result to the terminal devices. The intermediate server may forward or analyze various data such as the received request.

It should be noted that the server may be hardware or software. When the server is hardware, the server may be implemented as a distributed server cluster composed of a plurality of servers, or as a single server. When the server is software, the server may be implemented, for example, as a plurality of pieces of software or software modules for providing distributed services, or the server may be implemented as a single piece of software or software module. It is not specifically limited herein.

In practice, the method for testing a map service provided by embodiments of the present disclosure may be performed by the server 105, and the apparatus for testing a map service may also be provided in the server 105.

It should be understood that the numbers of terminal devices, networks and servers in FIG. 1 are merely illustrative. There may be any number of terminal devices, networks, and servers as desired for implementation.

Figure 2A:
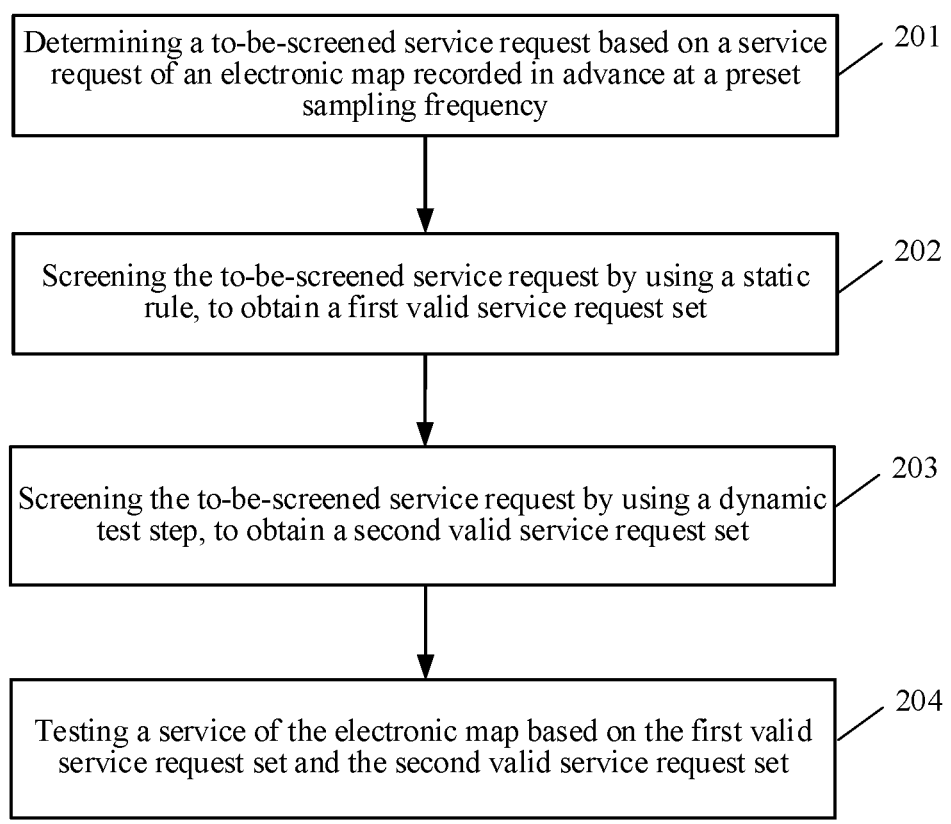
FIG. 2a is a flow diagram of an embodiment of a method for testing a map service according to an embodiment of the present disclosure.

Referring to FIG. 2a, a flow 200 of a method for testing a map service according to an embodiment of the present disclosure is shown. The method for testing a map service includes the following steps.

Step 201: determining a to-be-screened service request based on a service request of an electronic map recorded in advance at a preset sampling frequency.

In the present embodiment, the execution body (for example, running on the server shown in FIG. 1) of the method for testing the map service may acquire the service request of the electronic map recorded in advance at the preset sampling frequency.

Specifically, the service request of the electronic map recorded in advance at the preset sampling frequency may be stored in a local database or a cloud database, and when the to-be-screened service request needs to be determined, the service request of the recorded electronic map is read from the local database or the cloud database.

The recording of the electronic map may be performed using the method of recording the electronic map in the existing technology or developed in the future, which is not limited in embodiments of the present disclosure. For example, the real-time request of the user may be transmitted to the to-be-tested module offline through the pipeline by using the middleware installed to an online map service instance.

After obtaining the service request of the electronic map recorded in advance at the preset sampling frequency, the execution body may directly use the service request as the to-be-screened service request, or may further process the service request according to experience or requirements of actual application scenarios, so as to obtain the to-be-screened service request that satisfies the requirements. Then, the execution body performs subsequent screening tasks on the to-be-screened service request to obtain the valid service request.

Step 202: screening the to-be-screened service request by using a static rule, to obtain a first valid service request set.

In the present embodiment, the static rule may be implemented by using a rule statement, a rule template, a rule table, or the like. The static rule describes a string matching pattern that can be used to check whether a string contains a certain sub-string, to replace a matching sub-string, or to extract a sub-string meeting a certain condition from a certain string, and so on.

A person skilled in the art may use a static screening module to configure the static rule independently according to experience, and then use the static rule to screen the original service request. Specifically, the execution body may match a corresponding service request through the static rule, retain the service request conforming to the static rule, and delete an useless service request, thereby achieving the purpose of screening. The static rule may also have a function of retaining a specific request. An abnormal service request or a service request with less weight is retained each time as supplementation for next screening to maximize the coverage rate.

The execution body may obtain the first valid service request set after screening the to-be-screened service request by the static rule.

Step 203, screening the to-be-screened service request by using a dynamic test step, to obtain a second valid service request set.

In the present embodiment, the dynamic test step is introduced to complete the dynamic screening, considering that the valid service request screened by the static rule may not cover all scenarios. The dynamic test step sends each service request to the service dynamically, and determines whether the service request is valid by checking indexes such as a response, a log and a coverage rate of the service, retains the valid service request, and deletes an invalid service request, thereby obtaining the second valid service request set.

Step 204: testing a service of the electronic map based on the first valid service request set and the second valid service request set.

In the present embodiment, after obtaining the first valid service request set and the second valid service request set, the execution body may directly use the service requests in the first valid service request set and the second valid service request set to test the service of the electronic map, or may further perform data optimization on the valid service requests in the first valid service request set and the second valid service request set to obtain more efficient service request data, and further use the more efficient service request data to test the service of the electronic map.

A specific test method may be a method for testing a service of an electronic map in the existing technology or in the future, which is not limited in embodiments of the present disclosure. For example, an item of the electronic map, indexes such as a response, a log and a coverage rate of a service of a module of the electronic map may be tested.

According to the method for testing the map service in embodiments of the present disclosure, the static rule is used to screen the first valid service request set and the dynamic test step is used to screen the second valid service request set, so that the most valid service request in the original service requests is retained. The item test performed by using the valid service request may ensure that high scenario coverage can also be achieved under a short-time pressure test, and rapid iteration of the product is effectively supported.

In some alternative implementations of the step 202 of embodiments of the present disclosure, the screening the to-be-screened service request by using the static rule includes: screening the to-be-screened service request by using a string matching pattern represented by a regular expression, and/or screening the to-be-screened service request by using a preset retention rule, to obtain the first valid service request set.

In the present implementation, the regular expression describes a string matching pattern that can be used to check whether the service request contains a certain sub-string, to replace the matching sub-string or to extract a sub-string meeting a certain condition from the service request, etc., and the service requests of different modules and in different formats may be screened directly by the regular expression. The regular expression may also be understood as a logical formula for operating on a character string, which forms a "rule character string" by using some predetermined specific characters and combinations of these specific characters, and uses the "rule character string" to express a screening logic for the service request.

Based on the string matching pattern represented by the regular expression, whether the service request conforms to the screening logic of the regular expression (referred to as "matching") may be determined, and the specific portion required may also be obtained from the service request through the regular expression.

Alternatively or additionally, the to-be-screened service request may also be screened by using a preset retention rule. That is, the static rule may also have a function of retaining a specific request. An abnormal service request or a service request with less weight is retained each time.

In the present implementation, the string matching pattern represented by the regular expression is used and/or the preset retention rule is used for screening the to-be-screened service request, so that flexibility, logicality and functionality of the screening can be improved, and screening of the service request can be quickly achieved in a very simple manner, thereby improving screening efficiency and accuracy of screening results.

Optionally, the screening the to-be-screened service request by using the string matching pattern represented by the regular expression may include: obtaining a preset number of service requests matching the regular expression for each of all values conforming to the regular expression respectively; and/or obtaining a predetermined number of service requests matching the regular expression for all values conforming to the regular expression.

Here, a divergence and convergence function is designed. The execution body may adopt different strategies according to the values of divergence and convergence of each static rule. The divergence rule enumerates all values (i.e., character strings) of the character strings in the regular expression, and matches a preset number of service requests including each of the values. The convergence matches a predetermined number of service requests including all values of the character strings conforming to the rule.

For example, if the regular expression can match a total of m values in the screening, and the number of screening requests corresponding to the rule is n, then a total of m×n service requests are matched for the divergence, and a total of n service requests are matched for the aggregation. By this divergence and convergence function, the screening efficiency can be improved, the access cost of each module can be reduced, and the universality of the method for testing the map service can be improved.

Alternatively, the screening the to-be-screened service request by using the string matching pattern represented by the regular expression may include: screening the to-be-screened service request by using a plurality of threads concurrently based on different static rules represented by the regular expression.

Here, the plurality of threads are used to concurrently screen the to-be-screened service request based on different static rules represented by the regular expression, that is, the plurality of threads are used to perform parallel processing among a plurality of static rules for screening, thereby improving the screening efficiency by using machine resources to the maximum extent.

In some alternative implementations of step 203 of embodiments of the present disclosure, the screening the to-be-screened service request by using the dynamic test step, to obtain the second valid service request set may include: accessing each to-be-screened service request, and performing following screening step when accessing the each service request: sending a currently accessed service request to a backend service for testing to obtain a response and a log returned by the backend service; retaining, in response to determining that an index of the backend service verified by the response and the log satisfies at least one of: an increase value of a branch coverage rate is greater than 0 or an increase value of a row coverage rate is greater than 0, the currently accessed service request as a valid service request.

In the present implementation, when the dynamic test step is used for screening the to-be-screened service request, at least one of the branch coverage rate or the row coverage rate of the backend service may be checked at the same time. If the service request contributes to the improvement of the branch coverage rate or the row coverage rate of the backend service, the request is determined to be valid and retained.

According to the method for screening the to-be-screened service request by using the dynamic test step, the coverage rate of the backend service by the test request can be ensured while the number of service requests is reduced, and the accuracy of the screened valid service request is improved.

In some implementations of the embodiment shown in FIG. 2a, the method further includes performing following steps concurrently using a plurality of processes: screening the to-be-screened service request by using the static rule, to obtain the first valid service request set; and screening the to-be-screened service request by using the dynamic test step, to obtain the second valid service request set.

In the present implementation, when using the static rule and the dynamic test step for screening the to-be-screened service request, a plurality of processes may be adopted for each screening method to screen, so as to improve the efficiency of determining the first valid service request set and the second valid service request set using a machine resource.

In some alternative implementations of step 204 of embodiments of the present disclosure, the testing the service of the electronic map based on the first valid service request set and the second valid service request set includes: de-duplicating and combining valid service requests in the first valid service request set and the second valid service request set to obtain a target valid service request set; testing the service of the electronic map by using the valid service requests in the target valid service request set.

In alternative implementations, the first valid service request set screened by using the static rule and the second valid service request set screened by using the dynamic test step are de-duplicated and combined to obtain the target valid service request set used for testing finally, and then the valid service requests in the target valid service request set are used for testing the service of the electronic map. On the basis of simplifying the valid service requests in the target valid service request set, the coverage of the backend service by the valid service requests is ensured.

Figure 2B:
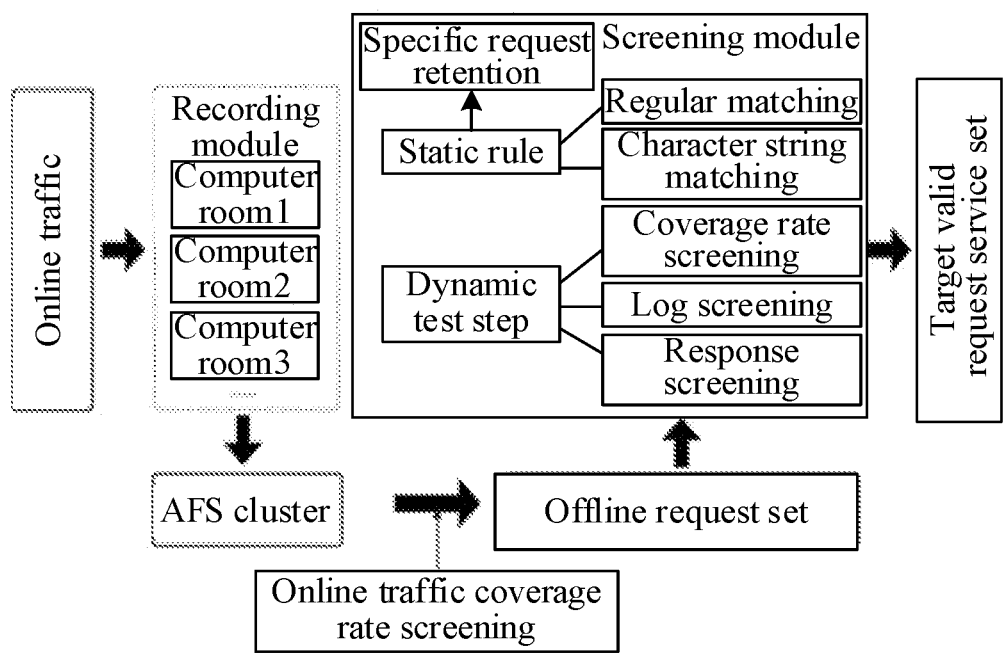
FIG. 2b is a flow diagram of an embodiment of a method for testing a map service according to an embodiment of the present disclosure.

Illustratively, referring to FIG. 2b, FIG. 2b illustrates a process of obtaining a target valid service request from online traffic to a recording module and a screening module.

An example application scenario of the method for testing a map service of embodiments of the present disclosure is described below in connection with FIG. 3.

Figure 3:
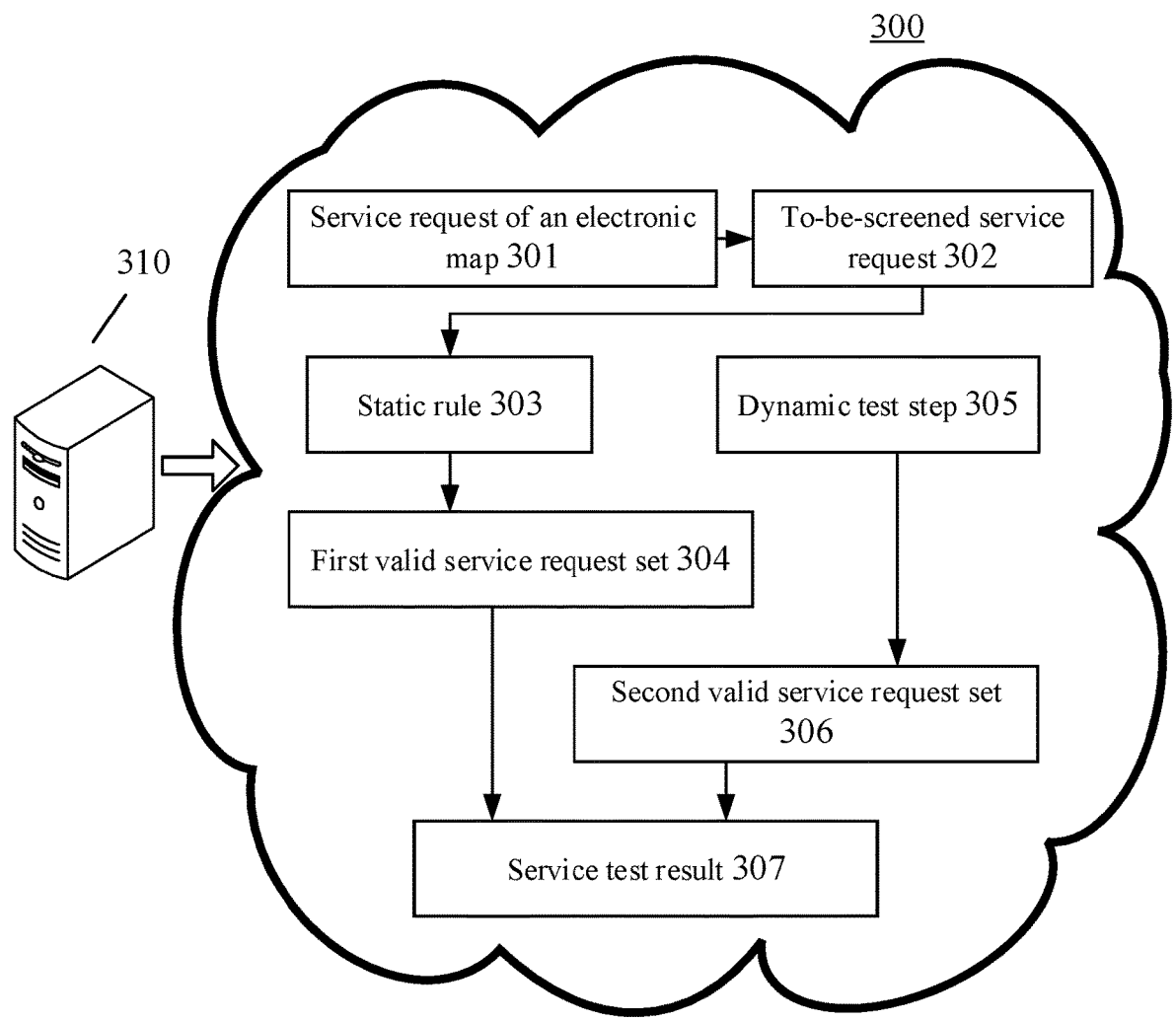
FIG. 3 is an example application scenario of a method for testing a map service according to an embodiment of the present disclosure.

As shown in FIG. 3, FIG. 3 illustrates an example application scenario of a method for testing a map service according to embodiments of the present disclosure.

As shown in FIG. 3, a method 300 for testing a map service is performed in an electronic device 310, and may include following steps.

First, a to-be-screened service request 302 is determined based on a service request 301 of an electronic map recorded in advance at a preset sampling frequency.

Then, the to-be-screened service request 302 is screened by using a static rule 303 to obtain a first valid service request set 304.

Then, the to-be-screened service request 302 is screened by using a dynamic test step 305 to obtain a second valid service request set 306.

Finally, the service of the electronic map is tested based on the first valid service request set 304 and the second valid service request set 306 to obtain a service test result 307.

It should be understood that the application scenario of the method for testing the map service shown in FIG. 3 mentioned above is merely an example description of the method for testing the map service, and does not represent a limitation on the method. For example, the steps shown in FIG. 3 mentioned above may be further implemented in more detail. The steps for other tests may also be further added on the basis of FIG. 3 described above.

Figure 4:
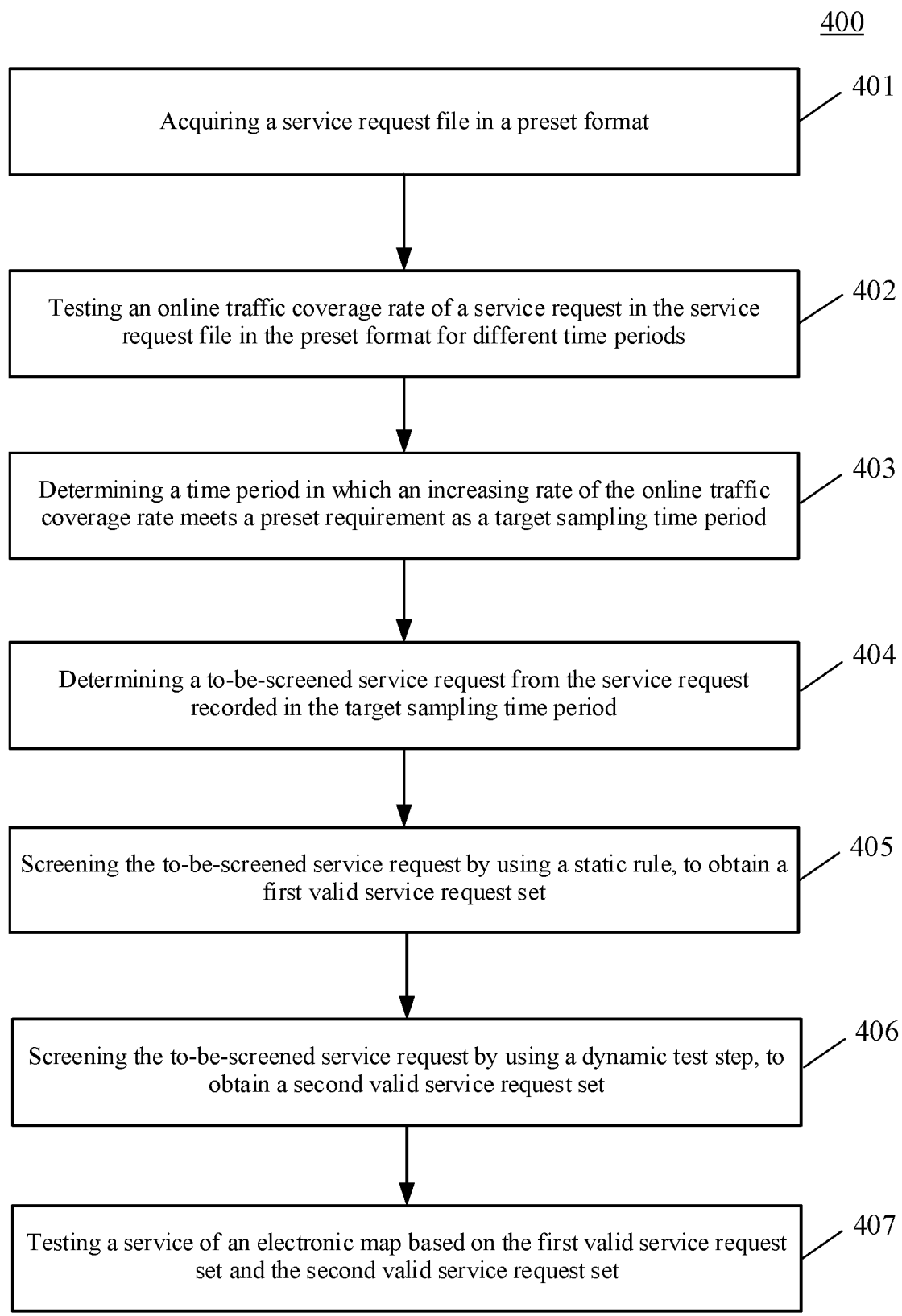
FIG. 4 is a flow diagram of another embodiment of a method for testing a map service according to an embodiment of the present disclosure.

Referring further to FIG. 4, there is shown a schematic flow diagram of another embodiment of a method for testing a map service according to an embodiment of the present disclosure.

As shown in FIG. 4, the method 400 for testing a map service of the present embodiment may include following steps.

Step 401: acquiring a service request file in a preset format.

In the present embodiment, the service request file in the preset format is a service request of an electronic map recorded in advance online at a preset sampling frequency and in the preset format.

When sampling, a dump request is dumped from an all-area machine room online to ensure that the obtained complete set of requests can cover all the scenarios online, and it does not occur that only a number of service request instances of an electronic map are selected and other test scenarios are omitted due to different travel behaviors of different areas.

Optionally, the service request of the electronic map recorded in advance online at the preset sampling frequency and in the preset format includes: the service request of the electronic map recorded in advance online at the preset sampling frequency and in the preset format via a remote procedure calling module.

Here, since each backend service of the electronic map transmits data packages through the remote procedure calling (rpc) module, a person skilled in the art can modify the framework code of the rpc module. When the request package is transmitted to the service through the rpc interface, the request of the service is printed out from the underlying framework, which can be applied to all the service modules, thereby solving the problem of universality of the recorded vocabulary, avoiding that each module modifies the code separately, improving the executability of the scheme greatly, and reducing the development workload of the user.

Alternatively, the method may further include: deleting, in response to determining that a total number of files in a dump directory of the service request of the electronic map recorded in advance online at the preset sampling frequency and in a preset format exceeds a file number threshold, a preset number of files in the dump directory according to distances of time stamps of the files in the dump directory to a current time from far to near.

Here, the total number of files in the dump directory is restricted. If the total number of files exceeds the file number threshold (that is, the maximum number of files), then the files with the earliest time stamps are deleted. Therefore, the total amount of the disk occupied by the dump directory does not change. The risk that the dump directory is too large to fill the disk due to high online traffic is avoided, and the occupation of minimum online resources is ensured.

Alternatively or additionally, the method may further include: restarting a recording switch in response to a monitoring process detecting that the recording switch is off. In this way, the stability of recording the service request can be improved.

Alternatively or additionally, the method may further include: rerunning a script file in response to the monitoring process detecting that the script file uploading the service request file in the preset format stops running. In this way, when the script file for uploading stops running, the process can be started immediately, thereby ensuring the stability of uploading the service request file.

In some alternative implementations of the present embodiment, the obtaining the service request file in the preset format includes: detecting the service request file in the preset format stored in a distributed file system cluster periodically; the service request file in the preset format stored in the distributed file system cluster is the service request file in the preset format recorded in advance online at the preset sampling frequency and in the preset format and uploaded at a preset time interval; performing, in response to determining that a detection result indicates a new service request file, streaming pull according to the preset sampling frequency, to obtain the service request of the electronic map recorded in advance at the preset sampling frequency.

Here, a dump file of a service request of each instance may be uploaded to the distributed file system (AFS) cluster at a preset time interval (for example, upload per hour), and the distributed file system periodically detects the cluster, and then performs streaming pull according to the preset sampling frequency after discovering a new service request file, thereby preventing blocking and lengthening production time of valid service requests, and improving efficiency of obtaining the service request file in the preset format.

Step 402: testing an online traffic coverage rate of the service request in the service request file in the preset format for different time periods.

In this embodiment, the coverage rate test may calculate the coverage rate of the online traffic at different time periods (e.g., morning rush hour, evening rush hour, etc.), respectively. After acquiring the service request file in the preset format, the execution body may test the online traffic coverage rate of the service request in the service request file in the preset format for different time periods in order to improve the coverage of the test request; then, according to the test result of the coverage rate, the full service requests are preliminarily selected to obtain the complete service request set used for screening by the screening module as the to-be-screened service requests.

Step 403: determining a time period in which an increasing rate of the online traffic coverage rate meets a preset requirement as a target sampling time period.

In the present embodiment, the trend graph of the online traffic coverage rate calculated in step 402 may be compared with the trend graph of all-day drainage coverage rate. A time period in which the increasing rate of the online traffic coverage rate reaches the preset requirement (for example, a time period with the highest increasing rate of the coverage rate or a time period with the top increasing rate of the coverage rate) may be determined as the target sampling time period.

Step 404, determining the to-be-screened service request from the service request recorded in the target sampling time period.

In the present embodiment, the execution body focuses on performing sampling on the service requests recorded in the target sampling period in the full service request set to obtain the to-be-screened service request.

It may be understood that the steps 401 to 404 may be implementations of the step 201. The to-be-screened service request is determined based on the service request of the electronic map recorded in advance at the preset sampling frequency. The to-be-screened service request may be determined from the service requests of all scenario online according to the test result of the coverage rate, thereby improving the validity and comprehensiveness of the determined to-be-screened service request.

Step 405, screening the to-be-screened service request by using a static rule to obtain a first valid service request set.

In the present embodiment, the static rule may be implemented by using a rule statement, a rule template, a rule table, or the like. The static rule describes a string matching pattern that can be used to check whether a string contains a certain sub-string, to replace a matching sub-string, or to extract a sub-string from a certain string that meets a certain condition, and so on.

Step 406, screening the to-be-screened service request by using a dynamic test step, to obtain a second valid service request set.

In the present embodiment, the dynamic test step is introduced to complete the dynamic screening, considering that the valid service request screened by the static rule may not cover all scenarios. The dynamic test step sends each service request to the service dynamically, and determines whether the service request is valid by checking indexes such as a response, a log and a coverage rate of the service, retains the valid service request, and deletes an invalid service request, thereby obtaining the second valid service request set.

Step 407, testing a service of the electronic map based on the first valid service request set and the second valid service request set.

In the present embodiment, after obtaining the first valid service request set and the second valid service request set, the execution body may directly use the service requests in the first valid service request set and the second valid service request set to test the service of the electronic map, or may further perform data optimization on the valid service requests in the first valid service request set and the second valid service request set to obtain more efficient service request data, and further use the more efficient service request data to test the service of the electronic map.

It should be understood that the operations and features in step 402-404 correspond to the operations and features in step 202-204, respectively. Therefore, the description of the operations and features in steps 202-204 is equally applicable to steps 402-404, and details are not described herein.

The difference between the method for testing a map service in the present embodiment and the method for testing a map service in FIG. 2a is that: an increasing rate of an online traffic coverage rate is used to determine the to-be-screened service request so as to ensure validity and comprehensiveness of the to-be-screened service request, thereby improving validity and comprehensiveness of valid service requests in the finally determined first valid service request set and the second valid service request set, thereby improving efficiency and accuracy of testing the service of the electronic map.

Figure 5:
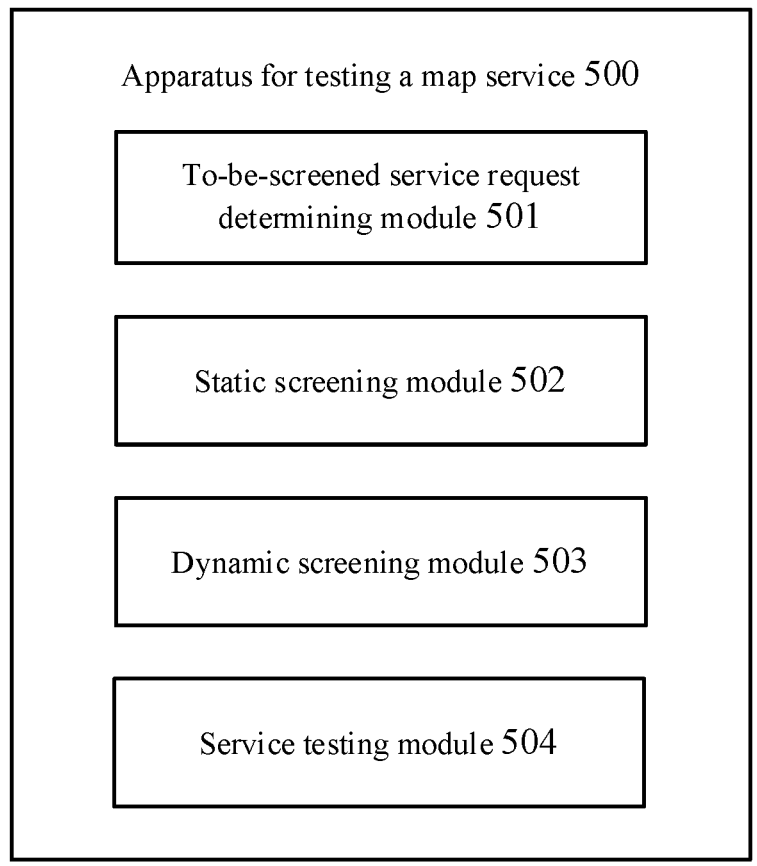
FIG. 5 is an example structural diagram of an embodiment of an apparatus for testing a map service according to an embodiment of the present disclosure.

With further reference to FIG. 5, an apparatus 500 for testing a map service of the present embodiment includes a to-be-screened service request determining module 501, configured to determine a to-be-screened service request based on a service request of an electronic map recorded in advance at a preset sampling frequency; a static screening module 502, configured to screen the to-be-screened service request by using a static rule to obtain a first valid service request set; a dynamic screening module 503, configured to screen the to-be-screened service request by using a dynamic test step to obtain a second valid service request set; a service testing module 504, configured to test a service of the electronic map based on the first valid service request set and the second valid service request set.

In some alternative implementations of the present embodiment, the to-be-screened service request determining module includes a service request file acquisition module, configured to acquire a service request file in a preset format; the service request file in the preset format is the service request of the electronic map recorded in advance online at the preset sampling frequency and in the preset format; a traffic coverage rate test module, configured to test an online traffic coverage rate of the service request in the service request file of the preset format for different time periods; a sampling time period determining module, configured to determine a time period in which an increasing rate of the online traffic coverage rate meets a preset requirement as a target sampling time period; a service request determining module, configured to determining the to-be-screened service request from the service request recorded in the target sampling time period.

In some alternative implementations of the present embodiment, the service request file acquisition module is further configured to detect the service request file in the preset format stored in a distributed file system cluster periodically; the service request file in the preset format stored in the distributed file system cluster is the service request file in the preset format recorded in advance online at the preset sampling frequency and in the preset format and uploaded at a preset time interval; perform, in response to determining that a detection result indicates a new service request file, streaming pull according to the preset sampling frequency, to obtain the service request of the electronic map recorded in advance at the preset sampling frequency.

In some alternative implementations of the present embodiment, the service request of the electronic map recorded in advance online in the preset sampling frequency and in the preset format includes: the service request of the electronic map recorded in advance online at the preset sampling frequency and in the preset format via a remote procedure calling module.

In some alternative implementations of the present embodiment, the static screening module is further configured to: screen the to-be-screened service request by using a string matching pattern represented by a regular expression, and/or screen the to-be-screened service request by using a preset retention rule, to obtain the first valid service request set.

In some alternative implementations of the present embodiment, the static screening module is further configured to: obtain a preset number of service requests matching the regular expression for each of all values conforming to the regular expression respectively; and/or obtain a predetermined number of service requests matching the regular expression for all values conforming to the regular expression.

In some alternative implementations of the present embodiment, screening the to-be-screened service request by using the string matching pattern represented by the regular expression includes: screening the to-be-screened service requests by using a plurality of threads concurrently based on different static rules represented by the regular expression.

In some alternative implementations of the present embodiment, the dynamic screening module is further configured to access each to-be-screened service request, and performing following screening steps when accessing the each service request: sending a currently accessed service request to a backend service for testing, to obtain a response and a log returned by the backend service; retain, in response to determining that an index of the backend service verified by the response and the log satisfies at least one of: an increase value of a branch coverage rate is greater than 0 or an increase value of a row coverage rate is greater than 0, the currently accessed service request as a valid service request.

In some alternative implementations of the present embodiment, the apparatus further includes a concurrent execution module, configured to perform following steps concurrently using a plurality of processes: screening the to-be-screened service request by using the static rule, to obtain the first valid service request set; and screening the to-be-screened service request by using the dynamic test step, to obtain the second valid service request set.

In some alternative implementations of the present embodiment, the service testing module is further configured to: de-duplicate and combine valid service requests in the first valid service request set and the second valid service request set, to obtain a target valid service request set; test the service of the electronic map by using the valid service requests in the target valid service request set.

In some alternative implementations of the present embodiment, the apparatus further includes at least one of: a dump file deleting module, configured to delete, in response to determining that a total number of files in a dump directory of the service request of the electronic map recorded in advance online at the preset sampling frequency and in a preset format exceeds a file number threshold, a preset number of files in the dump directory according to distances of time stamps of the files in the dump directory to a current time from far to near; a recording switch restart module, configured to restart a recording switch in response to a monitoring process detecting that the recording switch is off; a script file running module, configured to rerun a script file in response to the monitoring process detecting that the script file uploading the service request file in the preset format stops running.

It should be understood that each of the modules described in the apparatus 500 corresponds to each of the steps described in the method. The method is described with reference to FIGS. 2a-4. Thus, the operations and features described above with respect to the method are equally applicable to the apparatus 500 and the various modules contained therein, and details are not described herein.

Figure 6:
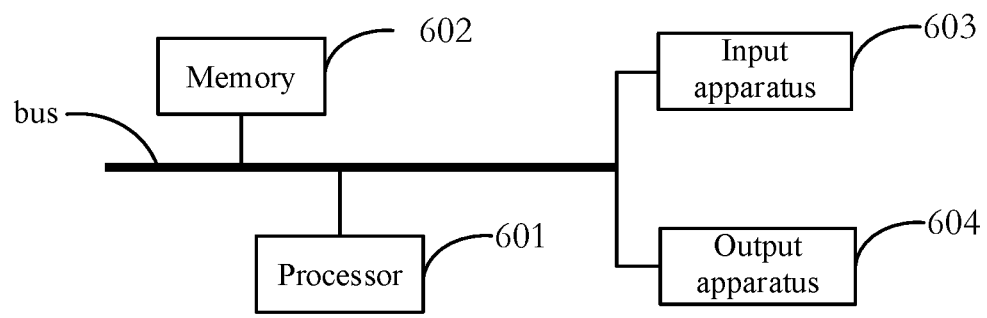
FIG. 6 is a block diagram of an electronic device for implementing the method for testing a map service of an embodiment of the present disclosure.

FIG. 6 is a block diagram of an electronic device for testing a method of a map service according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processors, cellular telephones, smart phones, wearable devices, and other similar computing devices. The components shown herein, their connections and relationships, and their functions merely illustrative and are not intended to limit the implementation of the present disclosure as described and/or claimed herein.

As shown in FIG. 6, the electronic device includes one or more processors 601, a memory 602, and an interface for connecting components, including a high speed interface and a low speed interface. The various components are interconnected by different buses and may be mounted on a common mainboard or otherwise as desired. The processor may process instructions executed within the electronic device, including instructions stored in the memory or on the memory to display graphical information of the GUI on an external input/output apparatus (e.g., a display device coupled to an interface). In other embodiments, a plurality of processors and/or a plurality of buses may be used with a plurality of memories, if desired. Similarly, a plurality of electronic devices may be connected, with each device providing portions of necessary operations (e.g., as a server array, a group of blade servers, or a multi-processor system). In FIG. 6, a processor 601 is taken as an example.

The memory 602 is a non-transitory computer readable storage medium provided in embodiments of the present disclosure. The memory stores instructions executable by at least one processor, such that the at least one processor executes the method for testing a map service provided in embodiments of the present disclosure. The non-transitory computer readable storage medium of embodiments of the present disclosure stores computer instructions. The computer instructions are used for causing a computer to execute the method for testing a map service provided in embodiments of the present disclosure.

The memory 602, as a non-transitory computer readable storage medium, may be used to store non-transitory software programs, non-transitory computer-executable programs, and modules, such as program instructions/modules (e.g., the to-be-screened service request determining module 501, the static screening module 502, the dynamic screening module 503, and the service testing module 504 shown in FIG. 5) corresponding to the method for testing a map service in embodiments of the present disclosure. The processor 601 executes various functional applications and data processing of the server by running non-transitory software programs, instructions, and modules stored in the memory 602, that is, implements the method for testing a map service in the method embodiment described above.

The memory 602 may include a storage program area and a storage data area, where the storage program area may store an operating system, an application program required by at least one function; the storage data area may store data or the like created according to the use of an electronic device for the method of testing a map service. In addition, the memory 602 may include high speed random access memory, and may also include non-transitory memory, such as at least one magnetic disk storage device, flash memory device, or other non-transitory solid state storage device. In some embodiments, the memory 602 may optionally include remotely disposed memory relative to the processor 601, which may be connected via a network to the electronic device for the method for testing a map service. Examples of such networks include, but are not limited to, the Internet, enterprise intranets, local area networks, mobile communication networks, and combinations thereof.

The electronic device for the method for testing a map service may further include an input apparatus 603 and an output apparatus 604. The processor 601, the memory 602, the input apparatus 603, and the output apparatus 604 may be connected via bus or otherwise, as illustrated in FIG. 6.

The input apparatus 603 may receive input digital or character information, and generate key signal inputs related to user settings and function control of the electronic device for performing the method for testing a map service, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and Internet.

The computer system may include a client and a server. The client and the server are generally remote from each other and typically interact through the communication network. The relationship between the client and the server is generated through computer programs running on the respective computers and having a client-server relationship to each other.

According to the technical solution of embodiments of the present application, it can be ensured that high scenario coverage can also be achieved under a short-time pressure test, and rapid iteration of a product can be effectively supported.

It should be understood that the various forms of processes shown above can be used to reorder, add, or delete steps. For example, the steps disclosed in embodiments of the present disclosure can be executed in parallel, sequentially, or in different orders, as long as the desired results of the technical solutions disclosed in embodiments of the present disclosure can be achieved. This is not limited herein.

The above specific implementations do not constitute a limitation to the protection scope of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be included within the protection scope of the present disclosure.

What is claimed is:

1. A method for testing a map service, the method comprising:
    determining a to-be-screened service request based on a service request of an electronic map recorded in advance at a preset sampling frequency;
    screening the to-be-screened service request by using a static rule, to obtain a first valid service request set;
    screening the to-be-screened service request by using a dynamic test step, to obtain a second valid service request set; and
    testing a service of the electronic map based on the first valid service request set and the second valid service request set.

2. The method according to claim 1, wherein the determining the to-be-screened service request based on the service request of the electronic map recorded in advance at the preset sampling frequency comprises:
    acquiring a service request file in a preset format; the service request file in the preset format is the service request of the electronic map recorded in advance online at the preset sampling frequency and in the preset format;
    testing an online traffic coverage rate of the service request in the service request file of the preset format for different time periods;
    determining a time period in which an increasing rate of the online traffic coverage rate meets a preset requirement as a target sampling time period; and
    determining the to-be-screened service request from the service request recorded in the target sampling time period.

3. The method according to claim 2, wherein the acquiring the service request file in the preset format comprises: detecting the service request file in the preset format stored in a distributed file system cluster periodically; the service request file in the preset format stored in the distributed file system cluster is the service request file in the preset format recorded in advance online at the preset sampling frequency and in the preset format and uploaded at a preset time interval; and performing, in response to determining that a detection result indicates a new service request file, streaming pull according to the preset sampling frequency, to obtain the service request of the electronic map recorded in advance at the preset sampling frequency.

4. The method according to claim 2, wherein the service request of the electronic map recorded in advance online at the preset sampling frequency and in the preset format comprises:
    the service request of the electronic map recorded in advance online at the preset sampling frequency and in the preset format via a remote procedure calling module.

5. The method according to claim 1, wherein the screening the to-be-screened service request by using the static rule, to obtain the first valid service request set comprises:
    screening the to-be-screened service request by using a string matching pattern represented by a regular expression, and/or screening the to-be-screened service request by using a preset retention rule, to obtain the first valid service request set.

6. The method according to claim 5, wherein the screening the to-be-screened service request by using the string matching pattern represented by the regular expression comprises:
    obtaining a preset number of service requests matching the regular expression for each of all values conforming to the regular expression respectively; and/or
    obtaining a predetermined number of service requests matching the regular expression for all values conforming to the regular expression.

7. The method according to claim 5, wherein the screening the to-be-screened service request by using the string matching pattern represented by the regular expression comprises:

screening the to-be-screened service request by using a plurality of threads concurrently based on different static rules represented by the regular expression.

8. The method according to claim 1, wherein the screening the to-be-screened service request by using the dynamic test step, to obtain the second valid service request set comprises:
    accessing each to-be-screened service request, and performing following screening steps when accessing the each service request:
    sending a currently accessed service request to a backend service for testing, to obtain a response and a log returned by the backend service; and
    retaining, in response to determining that an index of the backend service verified by the response and the log satisfies at least one of: an increase value of a branch coverage rate is greater than 0 or an increase value of a row coverage rate is greater than 0, the currently accessed service request as a valid service request.

9. The method according to claim 1, wherein the method further comprises:
    performing following steps concurrently using a plurality of processes:
    screening the to-be-screened service request by using the static rule, to obtain the first valid service request set; and
    screening the to-be-screened service request by using the dynamic test step, to obtain the second valid service request set.

10. The method according to claim 1, wherein the testing the service of the electronic map based on the first valid service request set and the second valid service request set comprises:
    de-duplicating and combining valid service requests in the first valid service request set and the second valid service request set, to obtain a target valid service request set; and
    testing the service of the electronic map using the valid service requests in the target valid service request set.

11. The method according to claim 9, wherein the method further comprises at least one of:
    deleting, in response to determining that a total number of files in a dump directory of the service request of the electronic map recorded in advance online at the preset sampling frequency and in a preset format exceeds a file number threshold, a preset number of files in the dump directory according to distances of time stamps of the files in the dump directory to a current time from far to near;
    restarting a recording switch in response to a monitoring process detecting that the recording switch is off; and
    rerunning a script file in response to the monitoring process detecting that the script file uploading the service request file in the preset format stops running.

12. An electronic device comprising:
    at least one processor; and
    a memory communicatively connected with at least one processor;
    the memory storing instructions executable by the at least one processor, and the instructions, when executed by the at least on processer, causing the at least one processor to perform operations, the operations comprising:
    determining a to-be-screened service request based on a service request of an electronic map recorded in advance at a preset sampling frequency;
    screening the to-be-screened service request by using a static rule, to obtain a first valid service request set;
    screening the to-be-screened service request by using a dynamic test step, to obtain a second valid service request set; and
    testing a service of the electronic map based on the first valid service request set and the second valid service request set.

13. A non-transitory computer readable storage medium, storing computer instructions, the computer instructions, when executed by a computer, causing the computer to perform operations, the operations comprising:
    determining a to-be-screened service request based on a service request of an electronic map recorded in advance at a preset sampling frequency;
    screening the to-be-screened service request by using a static rule, to obtain a first valid service request set;
    screening the to-be-screened service request by using a dynamic test step, to obtain a second valid service request set; and
    testing a service of the electronic map based on the first valid service request set and the second valid service request set.

* * * * *